(12) United States Patent
Koh

(10) Patent No.: US 8,671,049 B1
(45) Date of Patent: Mar. 11, 2014

(54) FINANCIAL SYSTEM AND METHOD BASED ON ABSOLUTE RETURNS

(71) Applicant: Thong Wei Koh, Chicago, IL (US)

(72) Inventor: Thong Wei Koh, Chicago, IL (US)

( * ) Notice: Subject to any disclaimer, the term of this patent is extended or adjusted under 35 U.S.C. 154(b) by 0 days.

(21) Appl. No.: 13/957,136

(22) Filed: Aug. 1, 2013

Related U.S. Application Data

(60) Provisional application No. 61/792,947, filed on Mar. 15, 2013, provisional application No. 61/723,547, filed on Nov. 7, 2012.

(51) Int. Cl.
*G06Q 40/00* (2012.01)

(52) U.S. Cl.
USPC .............................................. 705/37; 705/35

(58) Field of Classification Search
USPC ...................................................... 705/35, 37
See application file for complete search history.

(56) References Cited

U.S. PATENT DOCUMENTS

| | | | |
|---|---|---|---|
| RE43,435 E | 5/2012 | Krause | |
| 2005/0102214 A1 | 5/2005 | Speth et al. | |
| 2007/0106583 A1* | 5/2007 | Hiatt et al. | ................. 705/35 |

OTHER PUBLICATIONS

Goldman Sachs Quantitative Strategies Research Notes; Kresimir Demeterfi, et al.; "More Than You Ever Wanted to Know About Volatility Swaps"; Mar. 1999, 56 pages.

Carr, et al.; "Realised Volatility and Variance: Options Via Swaps"; Cutting Edge Volatility Options; Apr. 25, 2007; pp. 76-83.

* cited by examiner

*Primary Examiner* — Samica L Norman
(74) *Attorney, Agent, or Firm* — St. Onge Steward Johnston & Reens LLC

(57) ABSTRACT

A financial instrument exchange, system and method based upon the intensity of an underlying index. The instrument having a predetermined formula for a settlement price based at least in part on the formula:

$$AR = \left[\frac{1}{N}\sum_{j=1}^{N} r_j\right] \times C$$

where: N=a number of total observation periods; C=a constant multiplier; and $r_j$=a capped absolute period return calculated using the formula:

$$r_j = \min(d, |x_j|);$$

where: d=a contract period observation cap; and $x_j$=a period return based on a formula of the group consisting of:

$$x_j = \ln\left(\frac{I_j}{I_{j-1}}\right); \text{ and}$$

$$x_j = \left(\frac{I_j}{I_{j-1}}\right) - 1;$$

where: $I_j$=a reference index reported price/level j observation periods after an initial observation date/time. The periods can variable and measured in days, weeks, months, quarters and years. The instrument is traded at a market-determined price from creation through the date of expiration.

29 Claims, 9 Drawing Sheets

FIG. 3

|    | Date      | Index   | r     | RR     | FR     | AR     |
|----|-----------|---------|-------|--------|--------|--------|
|    | 18-Jan-08 | 1325.19 |       |        | 113.51 | 113.51 |
| 1  | 22-Jan-08 | 1310.5  | 1.11% | 111.47 | 129.51 | 128.56 |
| 2  | 23-Jan-08 | 1338.6  | 2.12% | 161.81 | 121.20 | 125.47 |
| 3  | 24-Jan-08 | 1352.07 | 1.00% | 141.25 | 116.02 | 120.00 |
| 4  | 25-Jan-08 | 1330.61 | 1.60% | 145.94 | 121.45 | 126.60 |
| 5  | 28-Jan-08 | 1353.96 | 1.74% | 151.54 | 116.02 | 125.37 |
| 6  | 29-Jan-08 | 1362.3  | 0.61% | 136.52 | 114.10 | 121.18 |
| 7  | 30-Jan-08 | 1355.81 | 0.48% | 123.84 | 115.35 | 118.48 |
| 8  | 31-Jan-08 | 1378.55 | 1.66% | 129.15 | 109.42 | 117.73 |
| 9  | 1-Feb-08  | 1395.42 | 1.22% | 128.31 | 100.32 | 113.58 |
| 10 | 4-Feb-08  | 1380.82 | 1.05% | 126.00 | 108.54 | 117.73 |
| 11 | 5-Feb-08  | 1336.64 | 3.25% | 144.11 | 117.94 | 133.09 |
| 12 | 6-Feb-08  | 1326.45 | 0.77% | 138.48 | 120.99 | 132.03 |
| 13 | 7-Feb-08  | 1336.91 | 0.79% | 133.87 | 115.52 | 128.07 |
| 14 | 8-Feb-08  | 1331.29 | 0.42% | 127.31 | 116.98 | 124.59 |
| 15 | 11-Feb-08 | 1339.13 | 0.59% | 122.74 | 115.27 | 121.17 |
| 16 | 12-Feb-08 | 1348.86 | 0.72% | 119.59 | 109.96 | 118.07 |
| 17 | 13-Feb-08 | 1367.21 | 1.35% | 120.51 | 103.91 | 118.76 |
| 18 | 14-Feb-08 | 1348.86 | 1.35% | 121.32 | 106.66 | 120.55 |
| 19 | 15-Feb-08 | 1349.99 | 0.08% | 115.38 |        | 115.38 |

FINANCIAL SYSTEM AND METHOD BASED ON ABSOLUTE RETURNS

FIELD OF THE INVENTION

The invention relates to financial services, and more particularly to a financial system and method for providing a family of related financial instruments based on absolute returns with minimal contract specification complexity.

BACKGROUND OF THE INVENTION

The market crash during the Financial Crisis in 2008-2009 increased the level of uncertainty in the markets dramatically, and generated significant anxiety and financial losses for a wide spectrum of market participants. The severity of the stock market crash and the speed of the retracement highlight the effect of certain common behavioral traits and tendencies that caused many investors to take losses at the height of the crisis and subsequently underperform the market rally. Similar loss aversion behavior is observed amongst institutional investors causing trading patterns that aggressively reduce risk following losses and mildly increase risk following gains. These observations suggest that there is a need for new financial instruments to alleviate the anxiety of market participants during market turmoil, and which are transparent and easy to manage.

There are many products and financial instruments that offer different characteristics during a market sell-off. These range from specialized bear-market funds, structured products effectively providing market level stops, traditional options strategies used as insurance, inverse and leveraged inverse Exchange Traded Funds (ETF), to various volatility related products like variance swaps, VIX futures and associated Exchange Traded Notes (ETN). Common to these strategies is the suggestion that the performance of these instruments, when they are employed or triggered, exhibit substantial negative correlation to the markets contemporaneously. For example, both retail and institutional investors have been attracted to VIX-related products due largely to the statistically negative correlation to market returns.

Employing products that rely on a strong negative correlation to the market as a hedge for a long market portfolio is equivalent to an attempt to short the market. The timing of the use of such products as insurance against a market sell-off is the same problem facing market participants deciding when to reduce or to sell off their long market exposure, and when to buy to establish their long market exposure again. As it is observed previously, this exercise has led to losses due to common human psychology.

The recent growth in awareness and interest in volatility products like the VIX futures and associated ETFs/ETNs have popularized the use of levels of VIX, as a proxy of implied market forward volatility, to be an indication of market anxiety. The concept of the VIX and the volatility measure it represents is complex, and in popular usage, the actual VIX index levels are often compared against historical VIX levels in commentaries about expected market behavior; it is rare for commentaries to refer to the exact meaning of VIX and how it relates to expectations of the impact of market events. The VIX index is calculated using listed options quotes across a wide range of strikes over two front month option expiration terms. In markets without a deep and liquid listed options market, indices like the VIX can be unstable due to wide quotes, and the price discovery process is less effective with lower options market liquidity. In emerging markets without a listed options market, it would be impossible to define a VIX-like index. In more developed markets, liquidity in options market could be reduced significantly, and quotes across wide ranges of strikes could be unreliable and very wide during periods of extreme market stress and dislocations; this could affect the quality of the calculation of the VIX index and the settlement of financial derivatives based on the VIX index could be affected dramatically.

The VIX futures represent the exposure of a risk factor that is equivalent to the market's expectation of future level of market activity commonly expressed as implied volatility. Note that the VIX and VIX futures are rolling forward expectations of market volatility; there is no mechanism to explicitly reward users of the product if the anticipated level of market activity actually occurred, except to sell the futures after the event, relying on market expectation of autocorrelation of volatility. The market re-prices risks and implied volatility very quickly after an event. The mechanism to benefit from actual market activity is known as realized volatility. Realized volatility, in contrast to future implied volatility, is defined by measures dependent on actual market movements during a historical period.

Standard options such as put and call options, or other products offering some contingency payoffs, provide a certain level of insurance against a market sell-off for the price of the option premium. For most non-professional market participants, the use of these contingent payoff products as insurance could incur expensive premium outlay over the long run. In addition, expiration cycles and contract specification details are complications that could deter many market participants. These products include exposure to implied volatility and directional insurance. As with all insurance products, the premium is not recoverable if the contingent payoff is not triggered by the actual event. Although the price of options take into account of future implied volatility, actual realized volatility is not compensated without additional active hedging.

Markets could gyrate violently over a period and end up at the same level. This happened many times in recent years with examples like the Bear Stearns collapse in 2008, Flash Crash in 2010, Japanese tsunami and nuclear incident in 2011, and S&P US Downgrade in 2011. For example, over a 2 month period, February 2011 to end of March 2011, bracketing the Japanese tsunami and nuclear incident in Fukushima, the market re-priced implied volatility as the market levels recover from a relatively quick sell-off to end with market levels and VIX levels relatively unchanged. A put option position, without dynamic hedging, held over this period would not have generated any profits if it is not sold at the height of the crisis to take advantage of the dramatic increase in volatility and drop in market level.

Variance swap or variance futures contracts may be useful to generate returns based on actual realized volatility from market gyrations over a fixed period without betting on the direction of the market moves. These contracts are defined to generate payoffs from functions of average squared observed returns. However, the standard variance swap contracts specifications involving calculations for volatility from squared returns is not intuitive to an average market participant, and even professionals are often confused when translating expected market movements from volatility measures. It is hard for an average person to relate his expectation of daily movements measured in returns to a square root of average squared future expected returns. Although the concept of variance is a mathematical measure used in standard option pricing methodology, it is not clear that the general population of market participants is aware of the potential disconnect between the expectation of average large moves in the market to a measure that is dependent on the actual distribution of the large moves.

There is a theoretical method of variance swap static replication using a continuum of standard options. In practice, perfect replication is not possible and subject to truncation that can lead to potentially large losses in a dramatic market crash. This is a real and significant problem in markets without sufficient options liquidity to construct the replicating options portfolio. Indeed, this has happened during the recent 2008 market crash causing significant losses to sellers of variance swaps due to the significant convexity in the payoff. Increasingly, variance swap contracts are traded with caps on maximum variance and this translates to a problem with pricing the value of this cap as an option on variance; this then invalidates the attraction of a simple theoretical static replication. Another development is the adoption of volatility swap that defines a payoff on the square root of variance; in doing so, there is no longer a static replication using standard listed options, and the problem with the non-intuitive definition of volatility still exists. The theory behind the management of volatility swap requires the dynamic management of the hedging options portfolio.

SUMMARY OF THE INVENTION

The notion of average absolute returns/deviations as a measure of market activity is adopted in order to have products that can be easily related to the experience of the majority of market participants. The intensity of market returns is defined as the average absolute market returns.

$$\text{Intensity} = \frac{\sum_{i=1}^{N} |x_i|}{N}$$

In general, given a sample of N returns, $x_i$, the average absolute returns/deviations is not the same as the square root of the average of squared returns (standard deviation) which is also commonly referred to as volatility.

$$\frac{\sum_{i=1}^{N} |x_i|}{N} \neq \sqrt{\frac{\sum_{i=1}^{N} x_i^2}{N}}$$

It is not obvious that this notion of intensity as defined is related to the commonly accepted definition of volatility in option pricing methodology. The accumulation of absolute function of market returns is at odds with the weight of standard financial engineering literature that relates prices of options to functions of squared market returns; this can be evidenced by the proliferation of products defined on variance and square root of variance including VIX, variance swaps, variance futures and volatility swaps.

The choice of a payoff for a successful financial instrument has to be carefully chosen and designed to relate to the experience of the majority of market participants and prove to be a useful measure that can be readily observed and estimated. The mathematical formulation defined as intensity is designed to closely relate to a popular notion of 'at-the-money' (ATM) volatility under a variety of assumptions of some common theoretical stochastic process models, especially for short dated maturities. Real world empirical market behavior often can be very different from model assumptions, and care must be exercised to understand the limitations of theoretical models under different scenarios. Even theoretically 'model-free' valuations are subject to the problem of practical implementation, and truncation and discreteness of replication can expose practitioners to significant risks. Therefore, it is important that products are designed such that their intrinsic value are closely related to lower moments of observable measures, and do not expose users to excessive amount of non-linear risks.

It is observed that standard options have naturally piecewise linear terminal payoffs, and the only way that a static option portfolio can have convexity across the full range of stock prices is to have a continuum of options at different strikes replicating a log contract at the heart of the variance swap; it is true that this can be approximated by a finite number of strikes, and in practice, replication is truncated. In this formulation, sellers of variance swaps should be aware that they are selling increasing amount of put options at far downside strikes; this is a very risky undertaking and it has demonstrated to be very costly in an extreme market event. For most options traders, who do not have variance swaps or equivalent risks on their portfolio, it is very rare to observe risks that exhibits convexity throughout all stock price scenarios; for example a long ATM straddle may generate convexity around current spot regions and loses convexity in spot ranges away from current spot level.

The introduction of variance related products like variance swaps and variance futures actually caused users of these products to be exposed to risks in extreme scenarios which are related to market prices of far downside strike options that are not regularly traded by professional options market participants. There are also suggestions to select different criteria to create measures that are related to truncation of the replication of the log contract. Volatility swaps, which are based on square root of variance, offer less extreme risk profiles but it necessitates the dynamic rebalancing of the options hedge. In practice, this is not very different from the need to dynamically manage near ATM related risks as the market moves. Indeed, options traders have been managing ATM related risks from vanilla options positions for a long time, and traders are aware of the path-dependent nature of the risks.

A new financial instrument based on intensity would solve the problem of having an instrument that is understood by a majority of market participants and yet provide a non-trivial payoff that cannot be replicated with existing linear instruments in the market. Such an instrument can be listed as a futures product with minimal contract specification complexity. This document describes an invention of a number of financial instruments and a method of a computer implementation for a number of financial instruments that would simulate much of the features in options trading with a forward implied and a realized component based on absolute returns, which would be more efficient for derivative products to be defined, and less confusing for market participants.

BRIEF DESCRIPTION OF THE DRAWINGS

FIG. 3 shows calculations for RR,FR and AR for a hypothetical scenario with RR calculations consistent with the Underlying Reference Index.

DETAILED DESCRIPTION OF THE INVENTION

Figure 1:
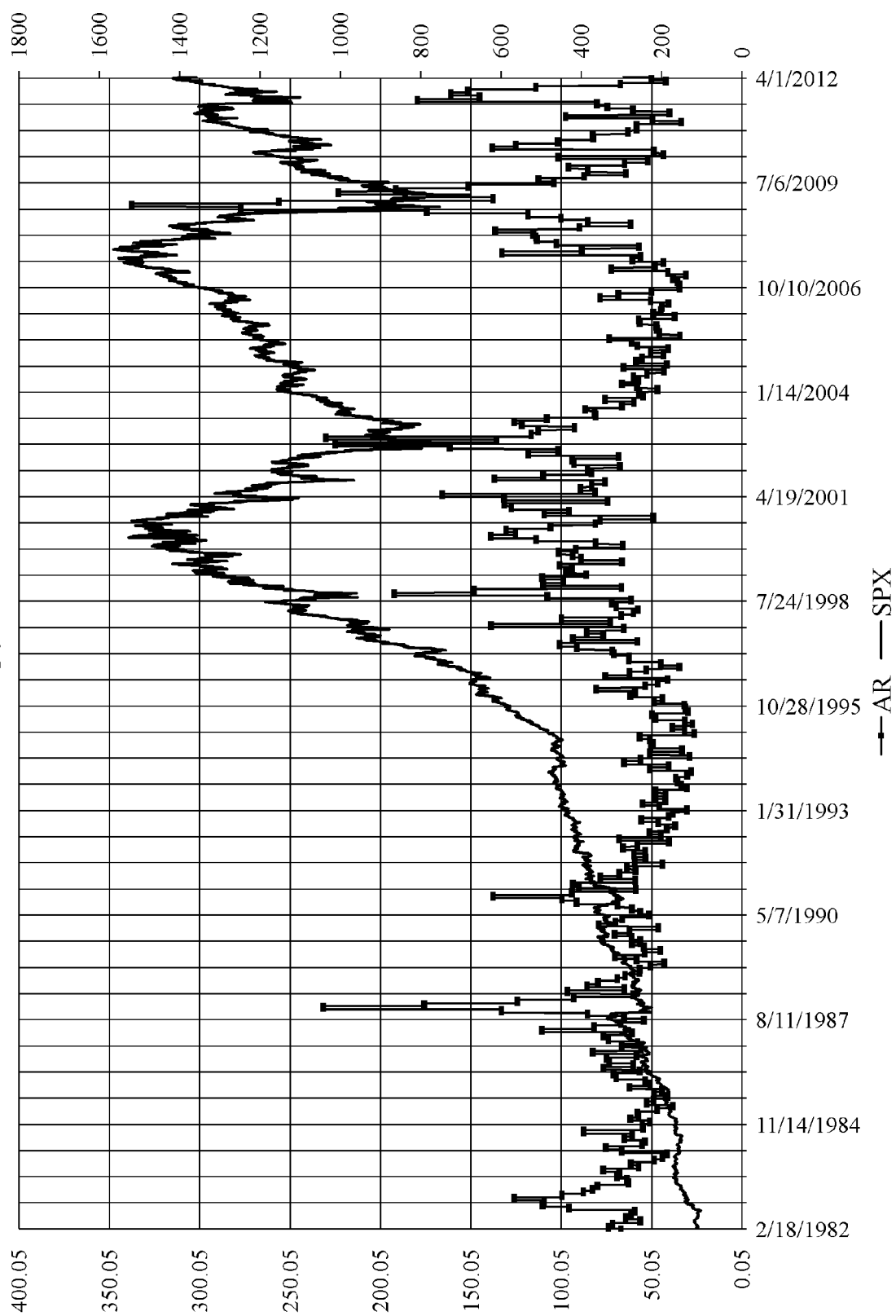
FIG. 1 shows graph of SPX (right y-axis) against AR (left y-axis) calculated on each third Friday of the month, and the number of observation days is taken to be the number of trading days from the third Friday of the previous month. Data is plotted for the period 1980 to 2012.

Other objects of the invention and its particular features and advantages will become more apparent from consideration of the following detailed description with reference to the drawings. It should be understood that the detailed description and specific examples, are intended for purposes of illustration only and are not intended to limit the scope of the invention.

The invention is a number of calculations required for the trading of proposed instruments and indices (HAR, AR, RR, FR, FRR, FRRC and FRRCret) and derivatives on these instruments and indices that are related to observations of absolute returns. These calculations can be computer implemented in a trading system for the creation and trading of financial instruments.

The first instrument is a futures contract that settles into an average of absolute periodic returns, for a specified frequency (for example, hourly, daily, weekly, monthly, quarterly, etc.) of an Underlying Reference Index over a fixed Observation Window, from an Initial Observation Date/Time (Date and Time) to a Settlement Date/Time. A key feature is the presence of an Observation Cap which limits the accumulation of observed absolute returns for each Observation Period within an Observation Window.

The future, named as AR future, settles into $$AR = \left[\frac{1}{N}\sum_{j=1}^{N} r_j\right] \times C$$

where C is a constant multiplier (e.g. 10000), $r_j$ is the capped absolute periodic return, $$r_j = \min(d, |x_j|)$$

and $x_j$ is the periodic return defined either as a log return $$x_j = \ln\left(\frac{I_j}{I_{j-1}}\right)$$

or simple return, $$x_j = \left(\frac{I_j}{I_{j-1}}\right) - 1$$

$I_j$ is the Underlying Reference Index reported price/level j Observation Periods after the Initial Observation Date/Time, d is the contract Observation Cap, and ln(x) is the natural logarithm function value of x, and |x| is the absolute value of x. The contract specification will specify the observation frequency and subdivide the Observation Window between the Initial Observation Date/Time and the Settlement Date/Time into N number of Observation Periods within the Observation Window.

The AR futures may settle into either cash or any other asset of equivalent value.

The Underlying Reference Index may be any financial instrument or calculated measure, and it may include, and not limited to, stocks, exchange traded products (ETNs and ETFs), foreign exchange rates, bonds and fixed income instruments, commodities, energy contracts and respective indices, futures, forward contract values and weighted baskets or functions of instruments and measures.

The periodic return may be adjusted for splits, dividend, fee or any reason and amount defined by the contract specification of the AR future.

A rolling historical index can be calculated in a fashion that the AR futures would settle into the value of the historical index at the expiration of the future. This calculation would have to take into consideration that the number of Observation Periods for each future may be different from one contract to the next. For example, if the observation frequency is daily, then different calendar months would have different number of trading days. Further, it is important to adjust this historical rolling if there were unexpected official disruption to trading at exchanges. The HAR index is calculated as the final settlement price of a AR future with the current date/time as the Final Observation date/time and calculated with the number of historical Observation Periods equal to the current Observation Window accounting for the different number of Observation Periods and disruptions. A HAR index may also be calculated with a fixed number of Observation Periods.

AR futures has an important feature that limits the potential loss per Observation Period for the seller of the future. The Observation Cap should help to reduce the insurance premium required to insure against outsized returns. These events may occur rarely but the uncertainty premium would have been a load on prices for buyers on average.

As discussed earlier, the potentially damaging risk of variance swaps has driven market participants to adopt overall cap on variance swaps payoff. The overall cap on variance swap is based on the total accrued realized variance and it has a different nature to the Observation Cap. A variance swap or variance futures with an overall cap could still suffer a dramatic 1-day or 1-period loss in a dramatic market sell-off if the position is unhedged; this potential loss would be a concern for exchanges and the amount of margin required for these products to maintain stability of the system against a catastrophic collapse of a major market participant due to losses. The benefit of an Observation Cap limits the potential loss due to the accumulation of realized intensity for each period, and allows the exchanges and regulatory authorities to have time to manage issues adequately. The presence of the Observation Cap coupled with the linear payoff structure could allow more market participants to benefit from selling the futures if they believe that the market is unlikely to be very active in the near future without taking on the same level of risk as selling variance swaps.

A sample performance of the Average Intensity Rate future, AR, with a daily Observation Frequency over the period 1980 to 2012 with an Observation Cap of 5% is illustrated in FIG. 1. FIG. 1 shows a plot of SPX levels against the AR calculated on each third Friday of the month; it shows how the value of the AR increases, as expected, over notable periods of significant market corrections, a. 'Black Monday' crash in October 1987, b. 'Russian Ruble crisis' in August 1998, c. 'Dot-Com bubble burst' from March 2000, and d. Global Financial Crisis from October 2008.

Figure 2A:
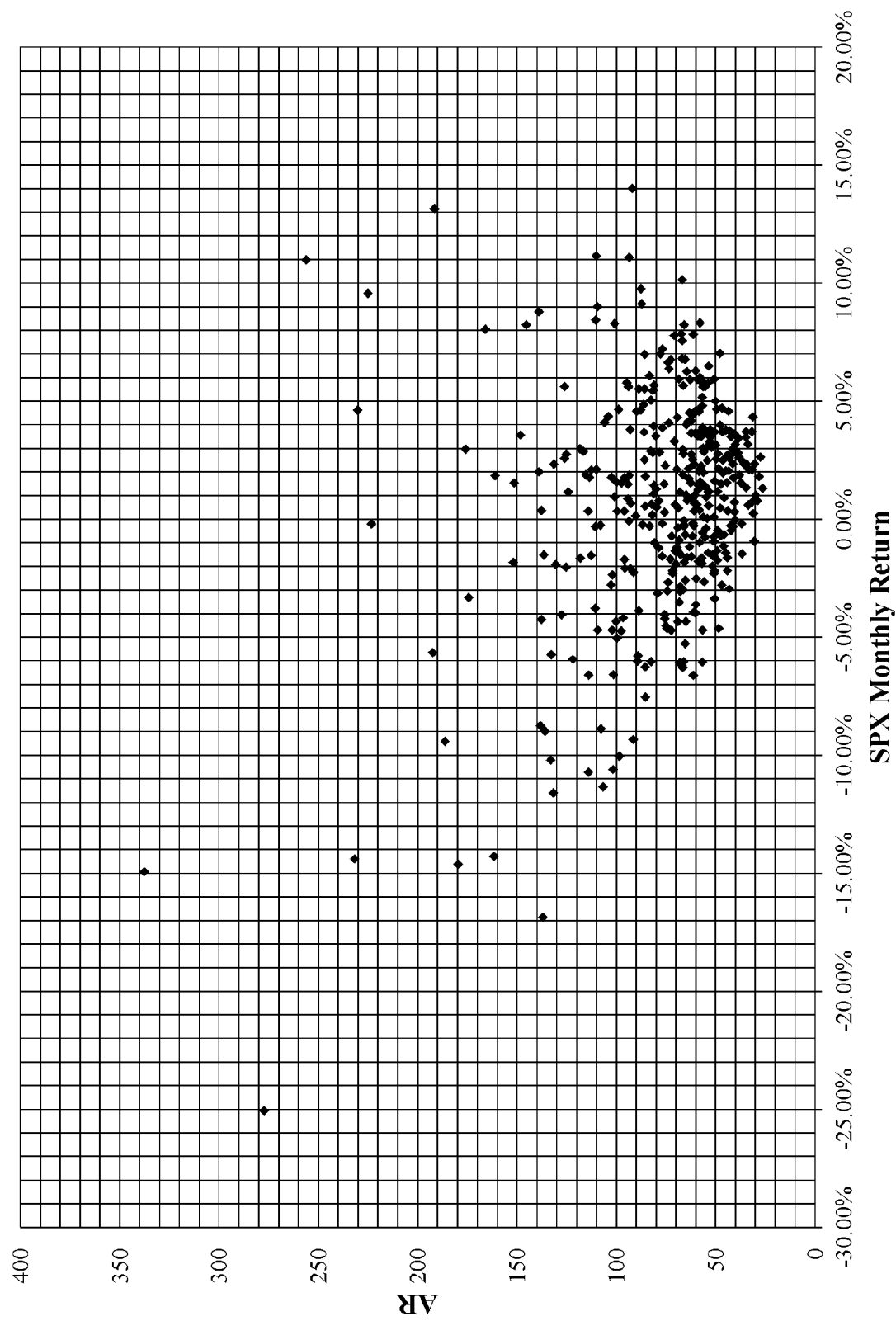
FIG. 2A shows AR levels (y-axis) against SPX Monthly Return (x-axis) calculated on each third Friday of the month referenced from the third Friday of the previous month: (SPX close at end of the month/SPX close observed at start of the month)−1.

The data in FIG. 1 is interpreted in FIG. 2A as a scatter plot of levels of AR against the performance of the SPX during the corresponding months; the chart shows that in months that the SPX drops, AR levels increase; however, if the SPX has a strong rally during the month, the AR will increase too. This means that AR levels are not strongly correlated to the performance of SPX returns.

Figure 2B:
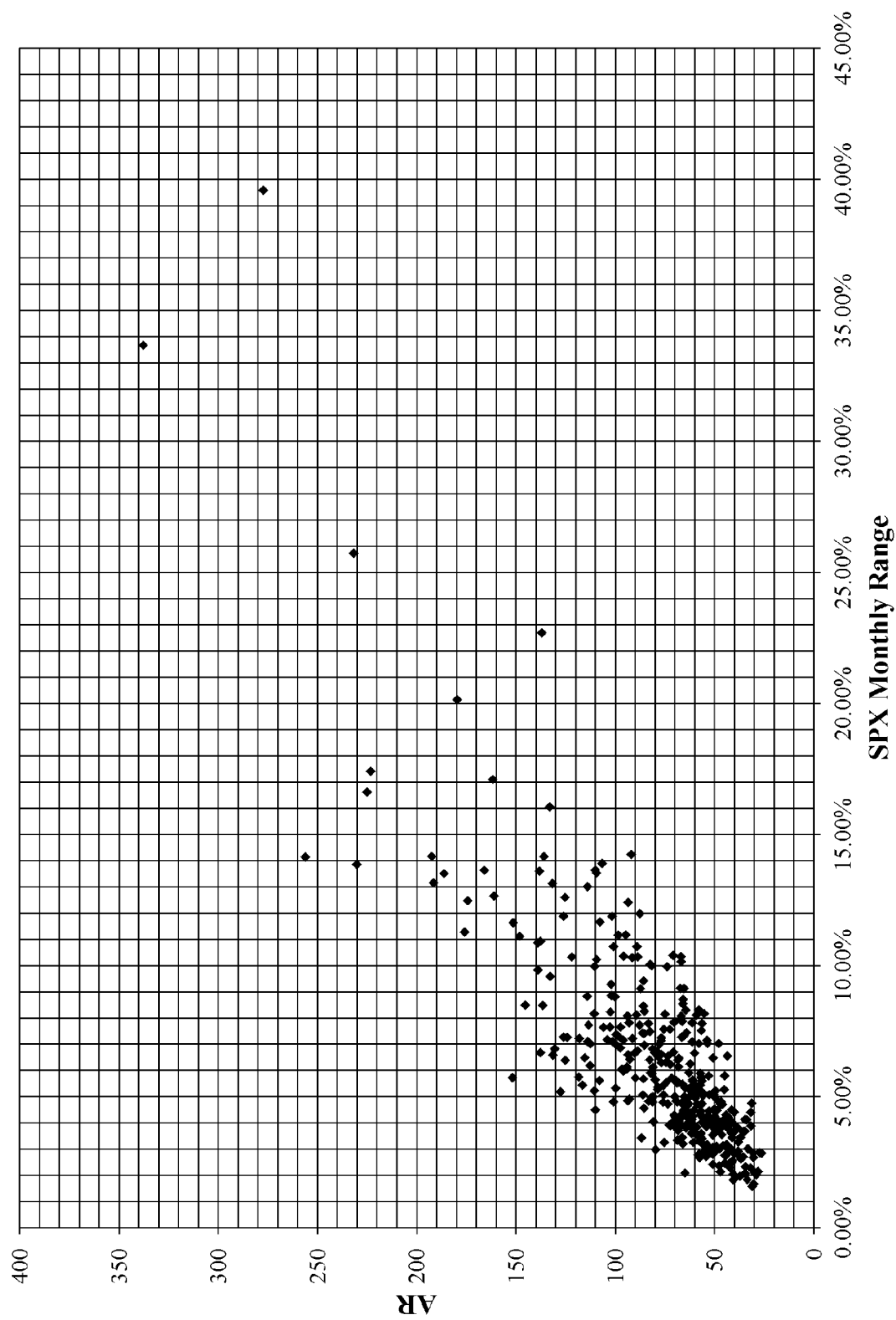
FIG. 2B shows AR levels (y-axis) against SPX Monthly Range calculated on each third Friday of the month referenced from the third Friday of the previous month: (Highest SPX close observed over the month/Lowest SPX close observed over the month)−1.

FIG. 2B shows the AR levels against the range of the SPX measured using the highest and lowest SPX levels during the corresponding months; this suggests that if the reference index, SPX, gyrates violently over a large range, the corresponding month will generate a higher AR level. The months with high ranges would include periods in which the SPX had undergone a large correction and a subsequent rally, a big rally and a significant retracement, dramatic crash or rally.

The major feature of the AR future is the use of the mean absolute deviation (return) rather than the definition of the standard deviation commonly used in finance and options pricing literature. In general, apart from the professional options trading community, volatility (used interchangeably with standard deviation) is not a common variable in trading decisions for the wider investing community. The AR future is designed to mimic some of the stylized dynamics of options trading. Before the settlement of the future, the AR is composed of two parts: a realized component, RR, and an expected future component, FR.

$$AR = \frac{n}{N}RR + \left(1 - \frac{n}{N}\right)FR$$

where $$RR = C \times \frac{1}{n}\sum_{j=1}^{n} r_j$$

n is the number of Observation Periods from the Initial Observation Date/Time, and N is the total Observation Periods within the current term futures Observation Window, and $r_j$ is the capped periodic absolute return as defined earlier and C is the constant multiplier.

The future component, FR, is then the market expectation of the average periodic absolute return for the rest of the Observation Periods to the settlement of the AR future. The FR is analogous to the implied volatility of an option and the RR is the representation of the realized volatility. The change in the price of the future would then represent the accrual of realized absolute return observed over the period and the changes in the market perception of the future moves in the market.

FIG. 3 is a hypothetical example of RR, FR and AR over a period of 19 days for a daily observation frequency AR future.

As an example using the hypothetical numbers presented in FIG. 3, a market participant on 29 Jan. 2008 thought that there was a risk of elevated market activity in the near future and he/she purchased a AR future at the end of the day at 121.18. Based on the realized intensity from the Initial Observation Date, RR, and the market quote of 121.18 for the AR future, the market implies an expected average absolute return of 1.14% (FR=114.10) from 30 Jan. 2008 to the Settlement Date of the AR future. There was a big market move on 5 Feb. 2008, and the AR futures increased in price due partly to the actual realized intensity and increase in expectation of future intensity. If the long AR futures position is sold at the end of the day on 5 Feb. 2008 at the market price of 133.09, there would be a profit of (133.09−121.18) multiplied by a contract multiplier typically specified by the contract specification of the future (there could be different versions of futures based on the same measure with different contract multipliers); if the contract multiplier is $100, then the profit would be (11.91×$100)=$1,191. If the futures position had been held to expiration on 15 Feb. 2008, the position would have been a loss as the futures settle to 115.38. Note that after the event on 5 Feb. 2008, the actual realized intensity from the market move is included in the value of the AR futures even if the implied future intensity, FR, has not moved as much as the AR futures did from 29 Jan. 2008.

The AR futures can be used to generate a constant maturity index of implied accrual rate. The current term future may include a realized accrued component over time, but the second term future, if its Initial Observation Date/Time is equal to the Settlement Date/Time of the first term future, called a serial term future, will be a representation of the market's expectation of the level of market activity over the next term.

The Forward Intensity Rolling Rate Index, FRR, is defined as $$FRR = \left(1 - \frac{n}{N}\right)FR_1 + \frac{n}{N}AR_2$$

where $FR_1$ is the FR calculated from front term AR future and $AR_2$ is the second serial term AR future that has the Initial Observation Date/Time equal to the Settlement Date/Time of the front term future, and n is the number of Observation Periods in the current term future, with a specified Observation frequency, from the Initial Observation Date/Time for the front term future, and N is the number of Observation Periods for the front term future. This index is a close analogy to the VIX. The FRR may be alternatively defined, and calculated, with N being a constant in the formula.

The Forward Intensity Rolling Rate Periodic Compound Index, FRRC, is defined as a periodic compounding index based on the performance of the two front term AR futures. The FRRC index at date/time, t, FRRC(t) is defined as:

$$FRRC(t) = FRRC(t-1) \times (1 + m \times (FRRCret(t) - 1))$$

$$FRRCret(t) = \frac{AR_1(t) - \left(\frac{n}{N}\right)RR_1(t-1) + \frac{n}{N}AR_2(t)}{AR_1(t-1) - \left(\frac{n}{N}\right)RR_1(t-1) + \frac{n}{N}AR_2(t-1)}$$

where n is the number of Observation Periods from the Initial Observation Date/Time for the current front term AR future, $AR_1$, at the previous Observation Period t−1, N is the total number of Observation Periods for the front term future, and $RR_1(t)$ is the realized component for the front term future, and $AR_1(t)$, $AR_2(t)$ are the first and second serial term AR future at end of Observation Period t, and $RR_1(t-1)$ is the realized component for the front term future, and $AR_1(t-1)$, $AR_2(t-1)$ are the first and second serial term AR futures at end of Observation Period t−1. The second serial term future has the Initial Observation Date/Time equal to the Settlement Date/Time of the front term future. The FRRC index may be computed with a specified scaling function or constant, m.

The indices, HAR, RR, FR, FRR and FRRC and measure FRRCret may be used as part of benchmark indices on which financial derivative products (options, futures, exchange traded products) that settle on functions derived from the value of the respective indices can be defined and traded. In addition, ETNs and ETFs may be created that have net asset value per share that tracks the performance of these indices.

For example, an Exchange Traded Fund that is designed to generate returns that track FRRC would give market participants a unique product that offers an exposure to a rolling estimate of forward expectation of market intensity, and contain a component that is dependent on the performance of realized intensity.

The FRR is analogous to the VIX, and it is possible to create futures and derivatives on the index as is done for similar indices.

Figure 4:
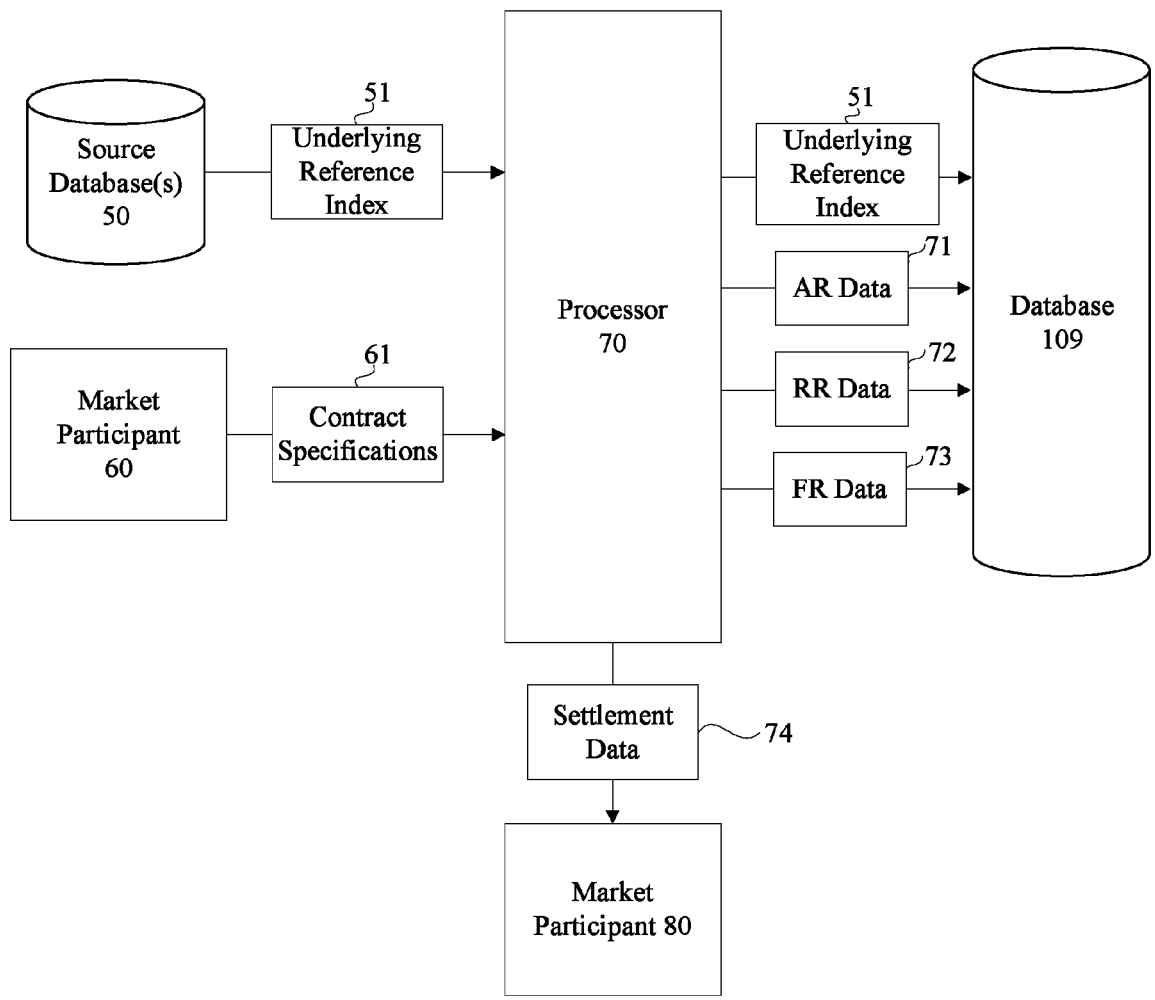
FIG. 4 illustrates an exemplary system according to the present invention to calculate and trade AR futures.

FIG. 4 illustrates an exemplary system according to the present invention. The system includes at least one processor 70 executing software to calculate the measures necessary to trade AR futures and provide data to facilitate trading. The processor 70 may reside on a server and/or computer managed by an Exchange, a designated calculation agent, one or more market participants, a system host, or a third party.

The processor 70 receives data from any number of local or remote source databases or storage devices 50. For example, a source database 50 (e.g., associated with an Exchange) may provide underlying reference index data 51 as described in more detail below.

The system further includes any number of market participants or participant servers (60, 80) which may include, for example, trading exchanges, brokers, individual traders, and/or clearing authorities. In the exemplary embodiment, the processor 70 receives data, e.g., contract specifications data 61, from a market participant 60.

The processor 70 executes software to perform the calculations discussed herein. A database 109 in communication with the processor 70 stores data received or generated by the processor 70 including, for example, the underlying reference index data 51, AR data, RR data, and FR data. The processor 70 may also store the contract specifications data 61, FRR data, FRRC data, and FRRCret data.

The processor 70 exports settlement data 74 to one more market participants 80. The settlement data 74 may include, for example, a daily settlement price and/or any other data received or generated by the processor 70 to enable trading of AR futures.

Figure 5:
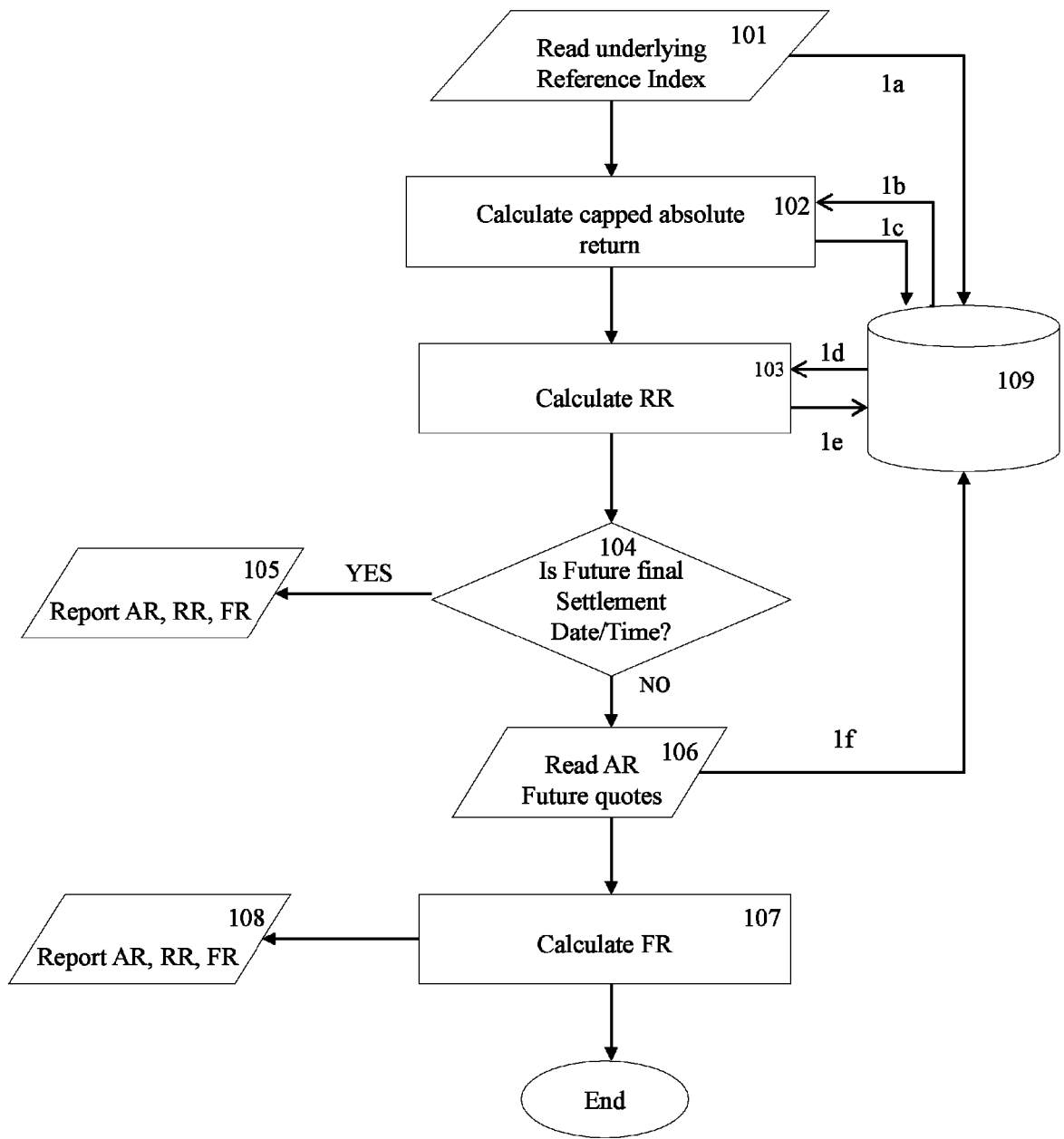
FIG. 5 illustrates an exemplary system and software according to the present invention to calculate the measures necessary to trade the AR futures.

FIG. 5 further illustrates the exemplary system and software according to the present invention to calculate the measures necessary to trade the AR futures.

Average Intensity Rate Futures (AR)

The AR future settles into $$AR = \left[\frac{1}{N}\sum_{j=1}^{N} r_j\right] \times C$$

where C is a constant multiplier (e.g. 10000), $r_j$ is the capped absolute periodic return, $$r_j = \min(d, |x_j|)$$

and $x_j$ is the periodic return defined either as $$x_j = \ln\left(\frac{I_j}{I_{j-1}}\right)$$

or $$x_j = \left(\frac{I_j}{I_{j-1}}\right) - 1$$

$I_j$ is the Underlying Reference Index reported price/level j Observation Periods after the Initial Observation Date/Time, d is the contract Observation Cap, and ln(x) is the natural logarithm function value of x, and |x| is the absolute value of X.

The contract specification for specific instances of AR futures will specify the Underlying Reference Index and denominated currency. The Underlying Reference Index could be any index, calculated measure or listed financial instrument that has official reported prices/levels.

Each AR future will have an Initial Observation Date/Time and a Settlement Date/Time which is a later date and time than the Initial Observation Date/Time. The contract specification will specify the observation frequency and subdivide the Observation Window between the Initial Observation Date/Time and the Settlement Date/Time into N number of Observation Periods within the Observation Window. Note that the contract specification may specify a modification of the number of Observation Periods and the actual exclusion of capped absolute returns from specific Observation Periods due to any reason. For example, exchanges may declare that market disruption events may exclude certain Observation Periods and the number of Observation Periods may be adjusted accordingly.

AR futures may be specified using either the log returns $$x_j = \ln\left(\frac{I_j}{I_{j-1}}\right)$$

or simple returns $$x_j = \left(\frac{I_j}{I_{j-1}}\right) - 1.$$

Unless the moves in the Underlying Reference Index are large enough, the difference between the two measures of returns is normally not significant.

The choice of the level of the Observation Cap is dependent on the Underlying Reference Index for the AR futures. Generally, more volatile Underlying Reference indices would have a higher level of Observation Cap. For example, equity instruments are likely to have cap levels ranging from 5%-10%. In addition, the level of the Observation Cap may be different for negative returns, $x_j<0$, and positive returns, $x_j>0$. This variation may be due to exchange rules governing different margining rules or circuit breaker rules for positive and negative returns, or for any other reason. A minor difference between the levels of the Observation Cap for negative and positive returns, not likely to affect the settlement of the AR futures for a significant proportion of scenarios in practice, would not represent a divergence from the invention.

The AR future as described has a multiplier, C, to aid human readability. Any other constant multiplier to the value of the AR, or lack thereof, does not present a divergence from the invention.

Before the expiration of the AR futures, the presence of market quotes for the AR futures allow the generation of two related indices, RR and FR that are important inputs to derivatives on the AR:

$$AR = \frac{n}{N}RR + \left(1 - \frac{n}{N}\right)FR$$

where $$RR = C \times \frac{1}{n}\sum_{j=1}^{n} r_j$$

and n is the number of Observation Periods from the Initial Observation Date/Time and N is the total Observation Periods in the future contract, and $r_j$ is the capped absolute return as defined earlier. The practical convention is that n is taken to be the number of full Observation Periods.

FIG. 5 illustrates an exemplary system and software according to the present invention to calculate the measures RR, FR values and AR settlement prices. The program is executed at the end of every Observation Period after the Underlying Reference Index official reported price/level is available.

Input Block (101): This Input block reads official reported price/level for the Underlying Reference Index as input. The reported prices/levels of the Underlying Reference Index, and associated dates and times are written (1a) and stored into a database (109) in a fashion that would enable computer programs to retrieve the reported prices/levels by the associated dates and times.

Processing Block (102): processing block to calculate the capped absolute return. Depending on the choice of contract specifications, this program block reads the reported price/level (1b) for the end of the previous Observation Period, $I_{j-1}$, and the reported price/level (1b) for the end of the current Observation Period, $I_j$, from the database (109), calculate $$x_j = \ln\left(\frac{I_j}{I_{j-1}}\right),$$

log returns, or $$x_j = \left(\frac{I_j}{I_{j-1}}\right) - 1,$$

simple returns, and compute the capped absolute return $r_j = \min(d, |x_j|)$. This value, $r_j$, and the current date and time is written (1c) and stored in the database (109) in a fashion that would enable computer programs to retrieve the value by the associated dates and times.

Processing Block (103): processing block retrieves a list of capped absolute returns (1d) from the database (109) for the dates and times from the Initial Observation Date/Time to current date and time. This program block then calculates $$RR = C \times \frac{1}{n}\sum_{j=1}^{n} r_j$$

where n is the number of Observation Periods from the Initial Observation Date/Time, and $r_j$ is the capped absolute return for Observation Period j from the Initial Observation Date/Time, and C is the constant multiplier. The value, RR is then stored, with the associated current Observation Period date and time (1e) into the database (109).

Conditional (104): This conditional block checks if the current date is the Settlement Date/Time for the current AR future as specified.

Output Block (105): This output block outputs the RR as calculated in program block (103) and sets the AR settlement price the same value as RR and the FR value is set to equal to RR.

Input Block (106): This input block reads the current market quote for the appropriate AR futures, and stores (1f) the AR futures quote with the current Observation Period date and time as the associated date and time for the observation.

Processing Block (107): This processing block calculates the FR from the formula, $$FR = \frac{AR - \frac{n}{N}RR}{\left(1 - \frac{n}{N}\right)},$$

using the value of RR calculated in (103) and AR value input in (106).

Output Block (108): This output block outputs RR and FR as calculated in (103) and (107), and sets the settlement price of AR to a pre-agreed formula based on the last trade, bid and ask quotes as normally practiced by the exchange.

Figure 6:
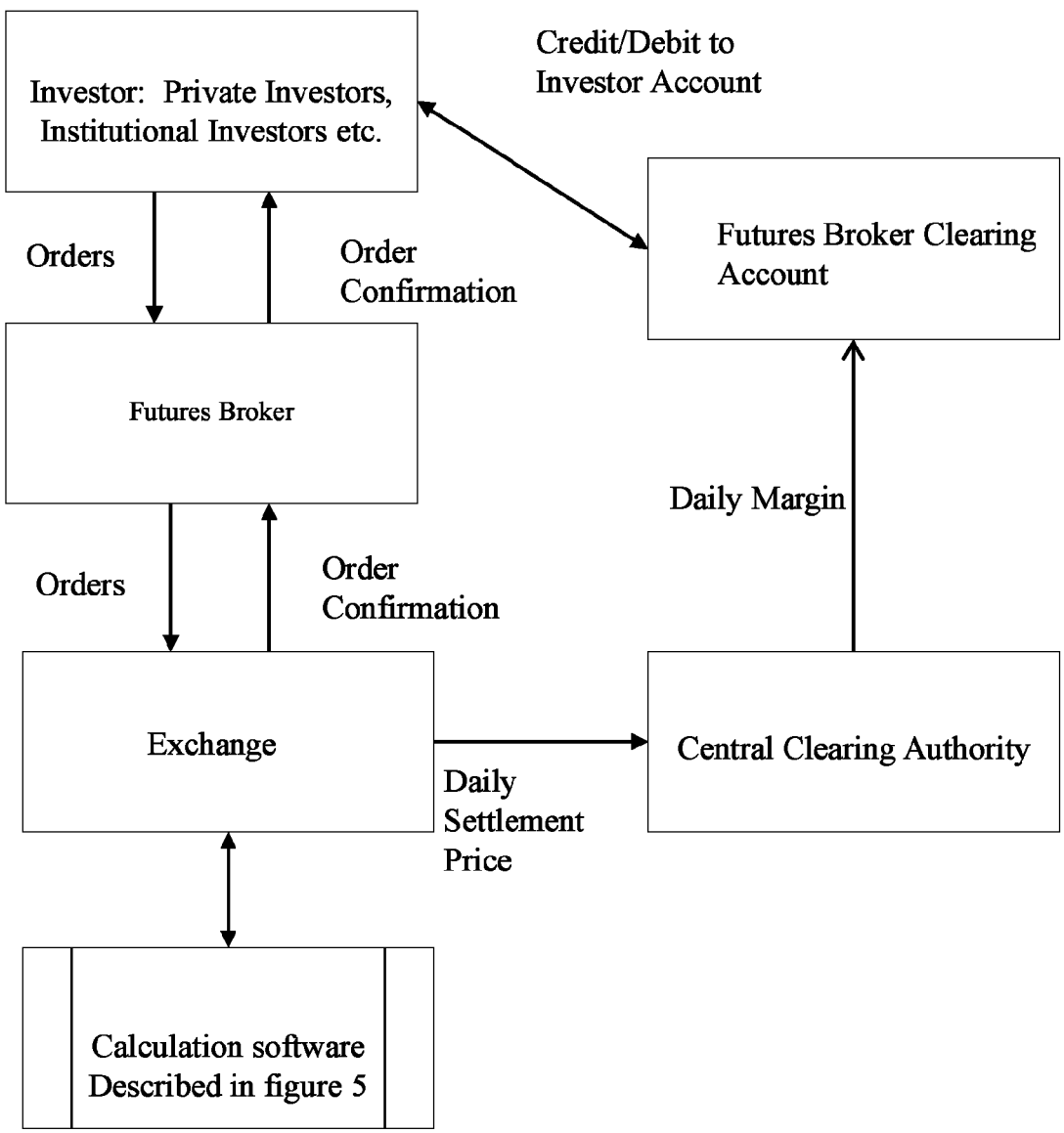
FIG. 6 illustrates an example of a use of the software calculation process described in FIG. 5.

FIG. 6. illustrates an example of the interaction of market participants, the exchange and use of the software described above; the market quotes and official reported prices/levels of the Underlying Reference Index are provided by the exchange to the software, and the software calculates the AR periodic settlement price (margining periodicity according to exchange practices and regulations), RR and FR as indices that would be disseminated to the market and relevant authorities. The software is primarily used by the Exchange, or a designated calculation agent, to calculate daily settlement prices of the AR futures, and disseminate official measures of historical realized intensity, RR. The Central Clearing Authority uses the daily settlement prices of AR futures to calculate daily margin requirements that would apply to the relevant market participants' account. Market participants would use the software to calculate the AR, RR and FR measures within their own risk system, pricing applications or trading systems based on historical data, market data and potential user defined scenarios as inputs.

Forward Intensity Rolling Rate Index (FRR)

The FRR is defined as $$FRR = \left(1 - \frac{n}{N}\right)FR_1 + \frac{n}{N}AR_2$$

where $FR_1$ is the FR calculated from front term AR future and $AR_2$ is the second serial term AR future, and n is the number of Observation Periods from the Initial Observation Date/Time for the front term future and N is the number of Observation Periods for the front term future. The second serial term future has the Initial Observation Date/Time equal to the Settlement Date/Time of the front term future. The FRR may be alternatively defined, and calculated, with N being a constant in the formula.

Forward Intensity Rolling Rate Periodic Compound Index (FRRC)

The FRRC is defined as a periodic compounding index based on the performance of the two front term AR futures. The FRRC index at the end of an Observation Period date/time, t, FRRC(t) is defined as:

$$FRRC(t) = FRRC(t-1) \times (1 + m \times (FRRCret(t) - 1))$$

$$FRRCret(t) = \frac{AR_1(t) - \left(\frac{n}{N}\right)RR_1(t-1) + \frac{n}{N}AR_2(t)}{AR_1(t-1) - \left(\frac{n}{N}\right)RR_1(t-1) + \frac{n}{N}AR_2(t-1)}$$

where n is the number of Observation Periods from the Initial Observation Date/Time for the current front term AR future, $AR_1$, at the previous Observation Period date/time t−1, N is the total number of Observation Periods for the front term future, and $RR_1(t)$ is the realized component for the front term future, and $AR_1(t), AR_2(t)$ are the first and second serial term AR future at end of Observation Period t, and $RR_1(t-1)$ is the realized component for the front term future, and $AR_1(t-1)$, $AR2t-1$ are the first and second serial term AR futures at end of Observation Period t−1. The second serial term future has the Initial Observation Date/Time equal to the Settlement Date/Time of the front term future. FRRC(t−1) is the FRRC index level for the previous Observation Period (t−1); An initial index level for the FRRC on the first day of the index could be arbitrarily defined.

Figure 7:
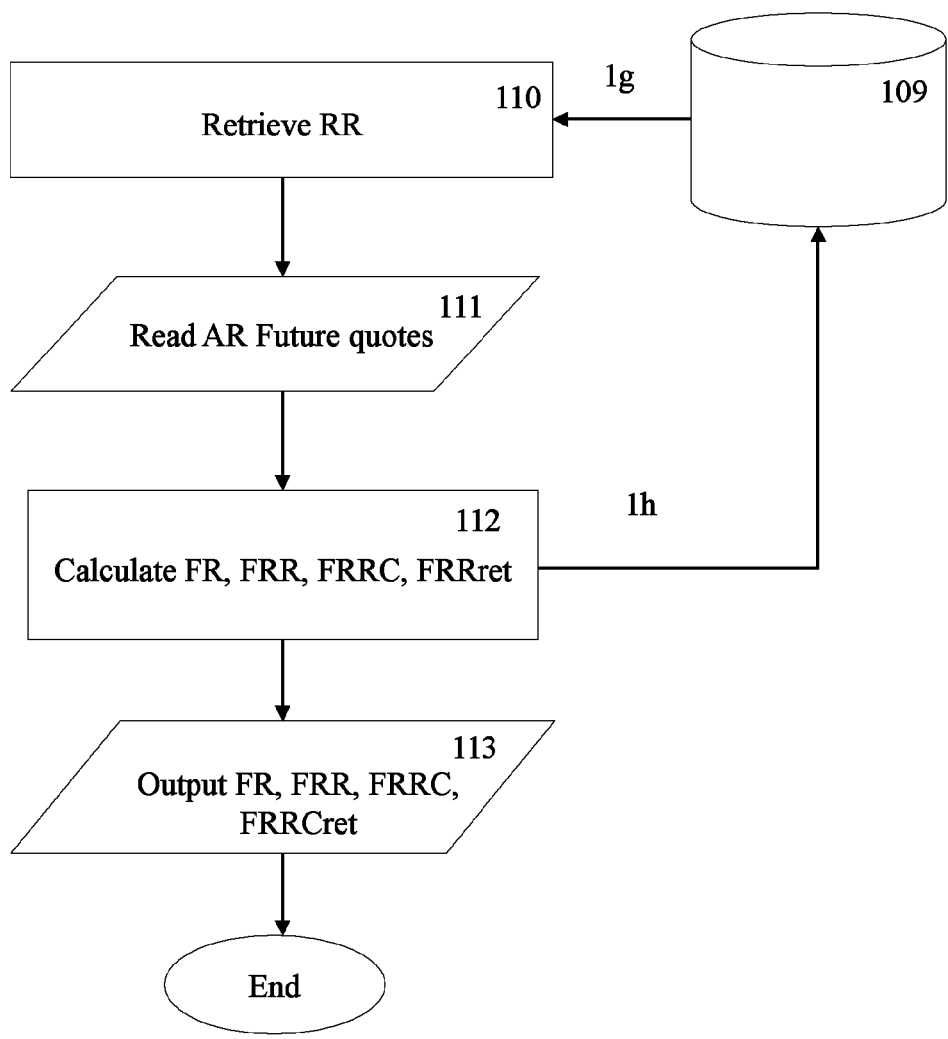
FIG. 7 illustrates an exemplary system and software according to the present invention to calculate the measures necessary to trade derivatives and instruments on FR, FRR, FRRC and FRRCret indices.

FIG. 7 illustrates an exemplary system and software according to the present invention to calculate the measures necessary to trade derivatives and instruments on FR, FRR, FRRC and FRRCret indices. As one of ordinary skill in the art will understand, the system and software may be employed together with the system hardware illustrated in FIG. 4.

The computer implementation described in FIG. 7 is intended to generate FR, FRR, FRRC, FRRCret values during and at the close of each Observation Period. The program reuses database (109).

Processing block (110): This processing block retrieves (1g) RR, AR values for the previous Observation Period for the front term AR future, RR(t−1, AR1(t−1) respectively, and the level of FRRC for the previous Observation Period, FRRC (t−1). Note that it is possible for the software to be modified to calculate RR(t−1) using inputs of Underlying Reference Index reported prices/levels from the Initial Observation Date/Time of the relevant AR future. For the first Observation Period of the FRRC index, the previous Observation Period's FRRC level in the formula can be taken to be an agreed initial index level.

Input block (111): This input block reads the current market quotes for the AR front term and second serial term futures, $AR_1(t), AR_2(t)$, where the Initial Observation Date/Time of the second serial term future is equal to the Settlement Date/Time of the front term future.

Processing block (112): This processing calculates FR, FRR, FRRC and FRRCret as defined $$FR_1 = \frac{AR_1 - \frac{n}{N}RR(t-1)}{\left(1 - \frac{n}{N}\right)}$$

$$FRR = \left(1 - \frac{n}{N}\right)FR_1 + \frac{n}{N}AR_2$$

$$FRRC(t) = FRRC(t-1) \times (1 + m \times (FRRCret(t) - 1))$$

$$FRRCret(t) = \frac{AR_1(t) - \left(\frac{n}{N}\right)RR_1(t-1) + \frac{n}{N}AR_2(t)}{AR_1(t-1) - \left(\frac{n}{N}\right)RR_1(t-1) + \frac{n}{N}AR_2(t-1)}$$

where n is the number of Observation Periods from the Initial Observation Date/Time for the current front term AR future, $AR_1$, at Observation Period t−1, N is the total number of Observation Periods for the front term future from the Initial Observation Date/Time to the Settlement Date/Time for the current front term future. The FRRC value for date and time t, is stored (1h) with the date and time, t, as the associated date and time in the database (109). m is the predetermined scaling constant or a function. The FRR may be alternatively defined, and calculated, with a constant N.

Output block (113): This output block reports $FR_1$, FRR, FRRC(t) and FRRCret(t).

The computer software described in FIG. 7 to calculate FR, FRR, FRRC and FRRCret would be used by a calculation agent as part of a process to generate target Net Asset Value per share for an Exchange Traded Fund or Exchange Traded Note financial product.

Historical Rolling Average Intensity Rate

A historical rolling average intensity rate, HAR, can be calculated as an index. This index may be useful to market participants as a reference index as part of a function to define a derivative that settles into cash or equivalent value in an asset. For example, it is possible to define an option that settles in a function of a particular calculation of HAR at expiration. A HAR is defined by the specification of a number of historical Observation Periods, K:

$$HAR = \left[\frac{1}{K}\sum_{j=1}^{K} r_j\right] \times C$$

where $r_j$ is the historical capped absolute return for j Observation Period prior to the current Observation Period, and C is a constant multiplier.

The number of historical Observation Periods can either be defined as a fixed constant, or it can be set to equal to the number of Observation Periods in the current Observation Window for a front term AR future. Note that the contract specification may reduce the number of valid Observation Periods as described previously.

Figure 8:
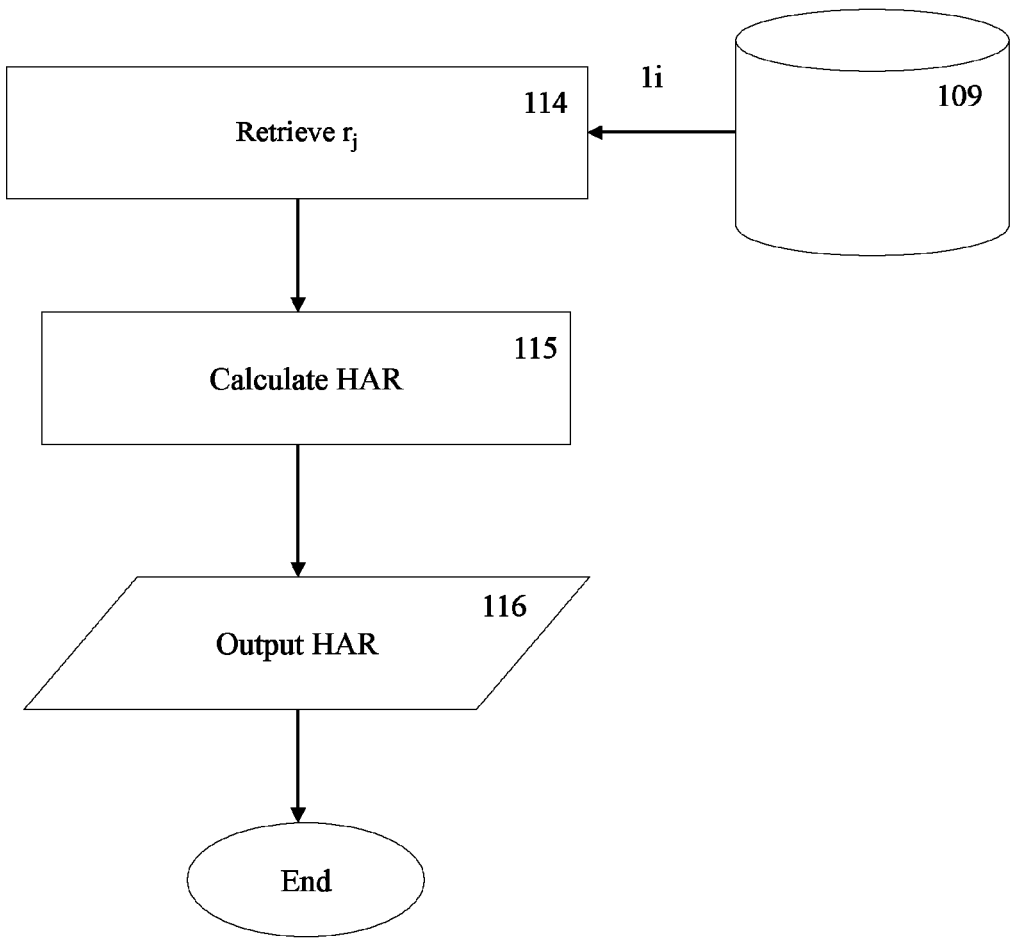
FIG. 8 illustrates an exemplary system and software according to the present invention to calculate a HAR index.

FIG. 8 illustrates an exemplary system and software according to the present invention to calculate a HAR index. As one of ordinary skill in the art will understand, the system and software may be employed together with the system hardware illustrated in FIG. 4.

Processing block (114): This processing block retrieves (1i) a series of capped absolute returns, $r_j$, for K most recent Observation Periods from the database (109).

Processing block (115): This processing block calculates the HAR index:

$$HAR = \left[\frac{1}{K}\sum_{j=1}^{K} r_j\right] \times C$$

Output block (116): This output block reports HAR.

Although the invention has been described with reference to particular arrangement of parts, features, and the like, these are not intended to exhaust all possible arrangements or features, and indeed many modifications and variations will be ascertainable to those of skill in the art. For instance, while the examples above reference the use of a period, window, frequency, etc. it should be understood that these are measures or portions of time, which can be calculated using any measurement. For example, the measurement may be made in seconds, minutes, hours, days, weeks, months, quarters, years, or any combination thereof. Furthermore, the value of the Underlying Reference Index, if part of a market, can be specified to be made at opening or close of the market, or anytime in between.

What is claimed is:

1. A computer implemented method for the creation and trading of financial instruments based upon the intensity of an underlying index comprising the following steps:
   (a) creating at least one futures contract by a computer, said at least one futures contract having a predetermined formula for a settlement price (AR) based at least in part on the following formula:

$$AR = \left[\frac{1}{N}\sum_{j=1}^{N} r_j\right] \times C$$

wherein:
   N=a number of total observation periods; and
   C=a constant multiplier; and
   $r_j$=a capped absolute period return calculated using the formula:

$r_j = \min(d, |x_j|)$;

wherein:
   d=a contract period observation cap; and
   $x_j$=a period return based on a formula of the group consisting of:

$$x_j = \ln\left(\frac{I_j}{I_{j-1}}\right); \text{ and}$$

$$x_j = \left(\frac{I_j}{I_{j-1}}\right) - 1;$$

wherein:
   $I_j$=a reference index reported price/level j observation periods after an initial observation date/time; and
   (b) trading said at least one futures contract at a market-determined price from creation through the date of expiration.

2. The method of claim 1, wherein the periods are measured in days.

3. The method of claim 1, wherein the periods are measured in weeks.

4. The method of claim 1, wherein the contract period observation cap is less than or equal to 10%.

5. The method of claim 1, wherein the contract period observation cap is between 10-20%.

6. The method of claim 1, wherein the contract period observation cap is greater than or equal to 20%.

7. The method of claim 1, further including calculating by computer a historical realized intensity (RR) of said at least one futures contract based at least in part on the following formula:

$$RR = \frac{1}{n}\sum_{j=1}^{n} r_j \times C;$$

wherein:
n=the number of observation periods from an initial observation date/time; and
C=a constant multiplier.

8. The method of claim 7, further including calculating by computer an expected forward average capped absolute return (FR) of said at least one futures contract based at least in part on the following formula:

$$FR = \frac{AR - \frac{n}{N}RR}{\left(1 - \frac{n}{N}\right)}.$$

9. The method according to claim 8, further comprising the step of generating at least one Forward Intensity Rolling Rate Index (FRR), Forward Intensity Rolling Rate Periodic Compound Index (FRRC) or Forward Intensity Rolling Rate Periodic Compound Index Return (FRRCret) value during and/or at the close of each observation period, wherein FRR, FRRC, and FRRCret are based at least in part on the following formulas:

$$FRR = \left(1 - \frac{n}{N}\right)FR_1 + \frac{n}{N}AR_2;$$

$$FRRC(t) = FRRC(t-1) \times (1 + m \times (FRRCret(t) - 1));$$

$$FRRCret(t) = \frac{AR_1(t) - \left(\frac{n}{N}\right)RR_1(t-1) + \frac{n}{N}AR_2(t)}{AR_1(t-1) - \left(\frac{n}{N}\right)RR_1(t-1) + \frac{n}{N}AR_2(t-1)}; \text{ and}$$

exporting the at least one FRR, FRRC, or FRRCret value to one or more market participants for trading.

10. The method of claim 1, wherein $x_j$, is based on the formula:

$$x_j = \ln\left(\frac{I_j}{I_{j-1}}\right).$$

11. The method of claim 1, wherein $x_j$, is based on the formula:

$$x_j = \left(\frac{I_j}{I_{j-1}}\right) - 1.$$

12. A method according to claim 1, further comprising the step of generating a Historical Rolling Average Intensity Rate (HAR) value based at least in part on the formula:

$$HAR = \left[\frac{1}{K}\sum_{j=1}^{K} r_j\right] \times C; \text{ and}$$

exporting the HAR value to one or more market participants for trading.

13. A method of trading a futures contract comprising:
Calculating, using software executing on a computer, a settlement price (AR) of a futures contract by averaging capped absolute returns of an underlying reference index over a fixed observation window;
trading said futures contract at a market price.

14. The method of trading a futures contract of claim 13, wherein the futures contract has an observation cap for each observation period.

15. The method of claim 14, wherein the settlement price (AR) is calculated based at least in part on the following formula:

$$AR = \left[\frac{1}{N}\sum_{j=1}^{N} r_j\right] \times C$$

wherein:
N=a number of total observation periods;
C=a constant multiplier; and
$r_j$=a capped absolute return calculated using the formula:

$r_j = \min(d, |x_j|);$ wherein:
d=the contract observation cap; and
$x_j$=a return based on a formula of the group consisting of:

$$x_j = \ln\left(\frac{I_j}{I_{j-1}}\right); \text{ and}$$

$$x_j = \left(\frac{I_j}{I_{j-1}}\right) - 1;$$

wherein:
$I_j$=a reference index reported price/level j observation periods after an initial observation date/time.

16. The method of claim 15, further including calculating a historical realized intensity (RR) of the futures contract based at least in part on the following formula:

$$RR = \frac{1}{n}\sum_{j=1}^{n} r_j \times C;$$

wherein:
n=the number of observation periods from an initial observation date/time; and
C=a constant multiplier.

17. The method of claim 16, further including calculating an expected forward average capped absolute return (FR) of the futures contract based at least in part on the following formula:

$$FR = \frac{AR - \frac{n}{N}RR}{\left(1 - \frac{n}{N}\right)}.$$

18. The method of claim 15, wherein $x_j$, is based on the formula:

$$x_j = \ln\left(\frac{I_j}{I_{j-1}}\right).$$

19. The method of claim 15, wherein $x_j$, is based on the formula:

$$x_j = \left(\frac{I_j}{I_{j-1}}\right) - 1.$$

20. A system for generating financial instruments based upon the intensity of an underlying index, comprising:
(a) a server;
(b) software executing on said serving generating at least one futures contract, said at least one futures contract having a predetermined formula for a settlement price (AR) based at least in part on the following formula:

$$AR = \left[\frac{1}{N}\sum_{j=1}^{N} r_j\right] \times C$$

wherein:
N=a number of total observation periods;
C=a constant multiplier; and
$r_j$=a capped absolute period return calculated using the formula:

$r_j = \min(d, |x_j|);$ wherein:
d=a contract period observation cap; and
$x_j$=a period return based on a formula of the group consisting of:

$$x_j = \ln\left(\frac{I_j}{I_{j-1}}\right); \text{ and}$$

$$x_j = \left(\frac{I_j}{I_{j-1}}\right) - 1;$$

wherein:

$I_j$=a reference index reported price/level j observation periods after an initial observation date/time; and (c) software executing on said server for exporting the settlement price (AR) to one or more market participants for trading.

21. The system according to claim 20, wherein the periods are measured in days.

22. The system according to claim 20, wherein the periods are measured in weeks.

23. The system according to claim 20, wherein the contract period observation cap is less than or equal to 10%.

24. The system according to claim 20, wherein the contract period observation cap is between 10-20%.

25. The system according to claim 20, wherein the contract period observation cap is greater than or equal to 20%.

26. A system for trading a futures contract, comprising:
at least one server;
software executing on said at least one server calculating a settlement price (AR) of a futures contract by averaging capped absolute returns of an underlying reference index over a fixed observation window;
software executing on said at least one server exporting the settlement price (AR) of said futures contract to one or more market participants for trading; and
software executing on said at least one server for trading the futures contract.

27. The system according to claim 26, wherein the settlement price (AR) is calculated based at least in part on the following formula:

$$AR = \left[\frac{1}{N}\sum_{j=1}^{N} r_j\right] \times C$$

wherein:

N=a number of total observation periods;

C=a constant multiplier; and $r_j$=a capped absolute return calculated using the formula:

$$r_j = \min(d, |x_j|);$$

wherein:

d=the contract observation cap; and $x_j$=a return based on a formula of the group consisting of:

$$x_j = \ln\left(\frac{I_j}{I_{j-1}}\right); \text{ and}$$

$$x_j = \left(\frac{I_j}{I_{j-1}}\right) - 1;$$

wherein:

$I_j$=a reference index reported price/level j observation periods after an initial observation date/time.

28. The method of claim 26, further including software executing on said at least one server calculating a historical realized intensity (RR) of the futures contract based at least in part on the following formula:

$$RR = \frac{1}{n}\sum_{j=1}^{n} r_j \times C;$$

wherein:

n=the number of observation periods from an initial observation date/time; and

C=a constant multiplier.

29. The system according to claim 28, further including software executing on said at least one server calculating an expected forward average capped absolute return (FR) of the futures contract based at least in part on the following formula:

$$FR = \frac{AR - \frac{n}{N}RR}{\left(1 - \frac{n}{N}\right)}.$$

* * * * *